United States Patent [19]
Choi

[11] Patent Number: 5,978,044
[45] Date of Patent: Nov. 2, 1999

[54] METHOD AND CIRCUIT FOR EFFECTING A PICTURE IN A TELEVISION SET BY MEANS OF DIGITAL CONVERGENCE

[75] Inventor: Han-Joo Choi, Kyungki-do, Rep. of Korea

[73] Assignee: Samsung Electronics Co., Ltd., Kyungki-do, Rep. of Korea

[21] Appl. No.: 08/774,615

[22] Filed: Dec. 30, 1996

[30] Foreign Application Priority Data

Dec. 30, 1995 [KR] Rep. of Korea ......... 95-72293

[51] Int. Cl.⁶ ......... H04N 9/74
[52] U.S. Cl. ......... 348/578; 348/745; 348/806
[58] Field of Search ......... 348/806, 807, 348/745, 746, 747, 578, 581, 565, 556, 913

[56] References Cited

U.S. PATENT DOCUMENTS

| | | | |
|---|---|---|---|
| 4,847,691 | 7/1989 | Barton | 348/578 |
| 5,161,002 | 11/1992 | Rodriguez-Cavazos | 348/445 |
| 5,592,240 | 1/1997 | Sakamoto | 348/806 |
| 5,671,025 | 9/1997 | Ryu | 348/746 |

*Primary Examiner*—Bryan Tung
*Attorney, Agent, or Firm*—Sughrue, Mion, Zinn, Macpeak & Seas, PLLC

[57] ABSTRACT

A circuit for achieving a special effect in a television set (TV) by means of digital convergence, which includes an operating circuit for operating a digital convergence and a memory for storing special effect data. The circuit includes a first memory for storing special effect data, a second memory for storing standard coincidence data and a CPU for operating on the standard coincidence data so as to produce special effect data in accordance with a user instruction.

9 Claims, 7 Drawing Sheets

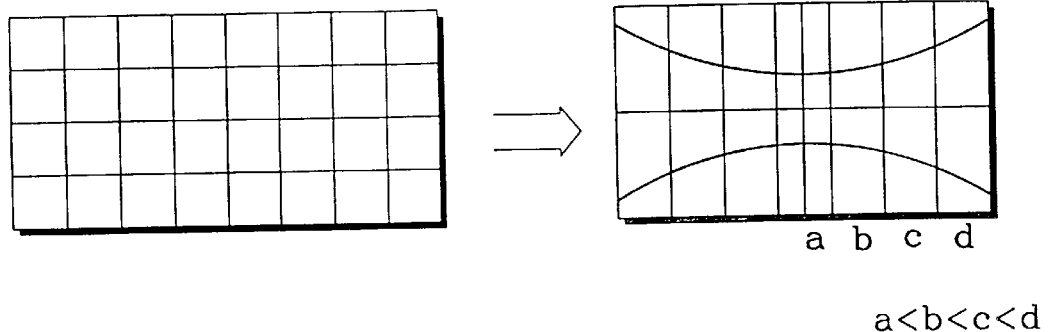
*Fig. 9A*     *Fig. 9B*
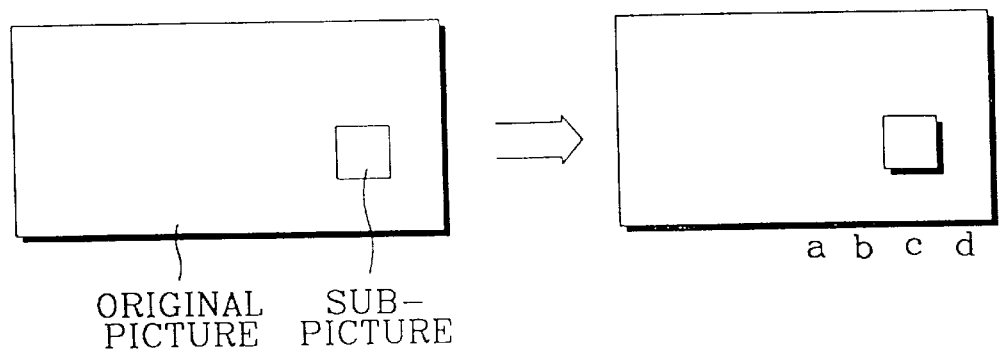
*Fig. 10A*     *Fig. 10B*

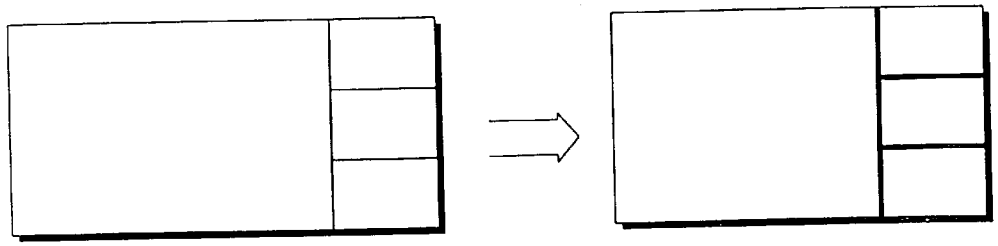
*Fig. 11A*  *Fig. 11B*
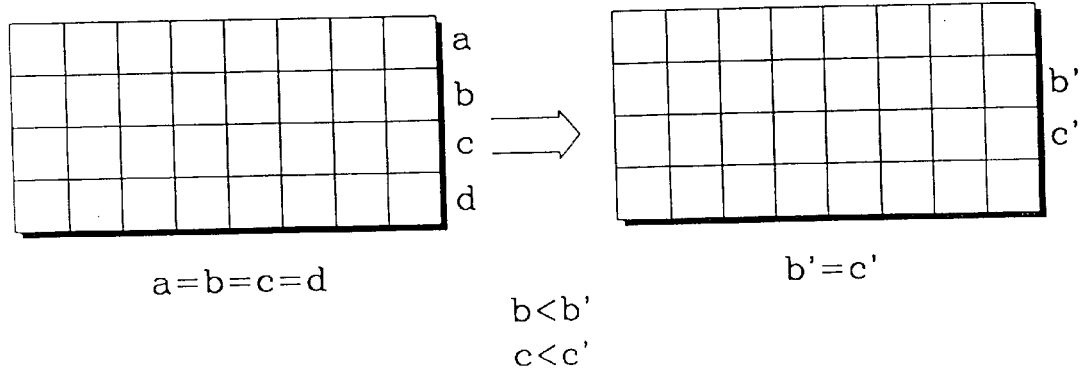
$a=b=c=d$  $b<b'$  $b'=c'$
$c<c'$
*Fig. 12A*  *Fig. 12B*

METHOD AND CIRCUIT FOR EFFECTING A PICTURE IN A TELEVISION SET BY MEANS OF DIGITAL CONVERGENCE

BACKGROUND OF THE INVENTION

1. Field of the Invention

The present invention relates to a method and circuit for performing special effects, and more particularly to a method and circuit for effecting special effects by means of digital convergence in a television set. The present application is based on Korean patent application 72293/1995 filed on Dec. 30, 1995, and incorporated herein by reference.

2. Description of the Related Art

In a known television set, referring to FIG. 1, a circuit for effecting a normal color coincidence picture in a CRT includes a program memory 105 for storing standard data which is accessed and operated on by a CPU 103, so as to provide color coincidence supplementary data which is converted to an analog signal by a D/A converter 106, with the analog signal being filtered by a filter 108 and then amplified by an amplifier 110 whose output is sent to a convergence coil 113. In the color coincidence operation, the CPU 103 accesses relevant standard data and produces color coincidence data in accordance with an instruction of a user, and thereafter the color coincidence data is converted to an analog signal by the D/A converter 106 and displayed on a CRT. After completing the color coincidence operation, the revised data is stored in the standard data storing memory (EEPROM) 112 by an instruction of a user so as to update the data. In the known circuit, however, it is possible to perform a color coincidence operation only on a normal pattern of a CRT picture, such as a grid pattern.

SUMMARY OF THE INVENTION

It is an object of the invention to provide a circuit for performing special effects on a picture by means of digital convergence.

According to the present invention, a circuit for achieving special effects in a television set (TV) by means of digital convergence, comprises an operating circuit for performing digital convergence, and a memory for storing special effect data so that the operating circuit can perform digital convergence in accordance with the stored special effect data.

The present invention will now be described more specifically with reference to the drawings attached only by way of example.

BRIEF DESCRIPTION OF THE DRAWINGS

A more complete appreciation of this invention, and many of the attendant advantages thereof, will be readily apparent by reference to the following detailed description when considered in conjunction with the accompanying drawings, in which like reference symbols indicate the same or similar components, wherein:

FIGS. 7A, 7B, 8A, 8B, 9A, 9B, 10A, 10B, 11A, 11B, 12A and 12B are sample graphs of special effects according to the present invention.

DETAILED DESCRIPTION OF THE PREFERRED EMBODIMENT

Figure 1:
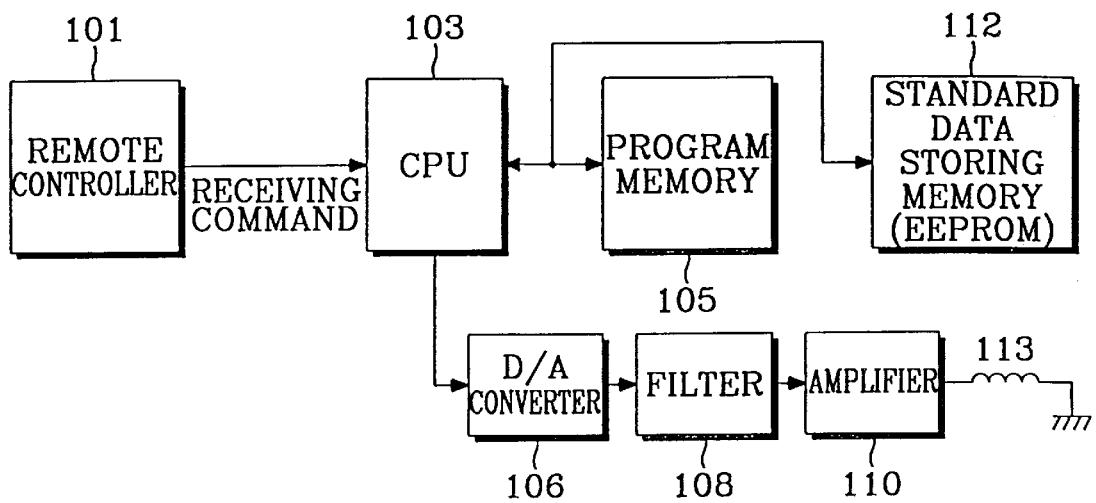
FIG. 1 is a circuit diagram of a known circuit.
Figure 2:
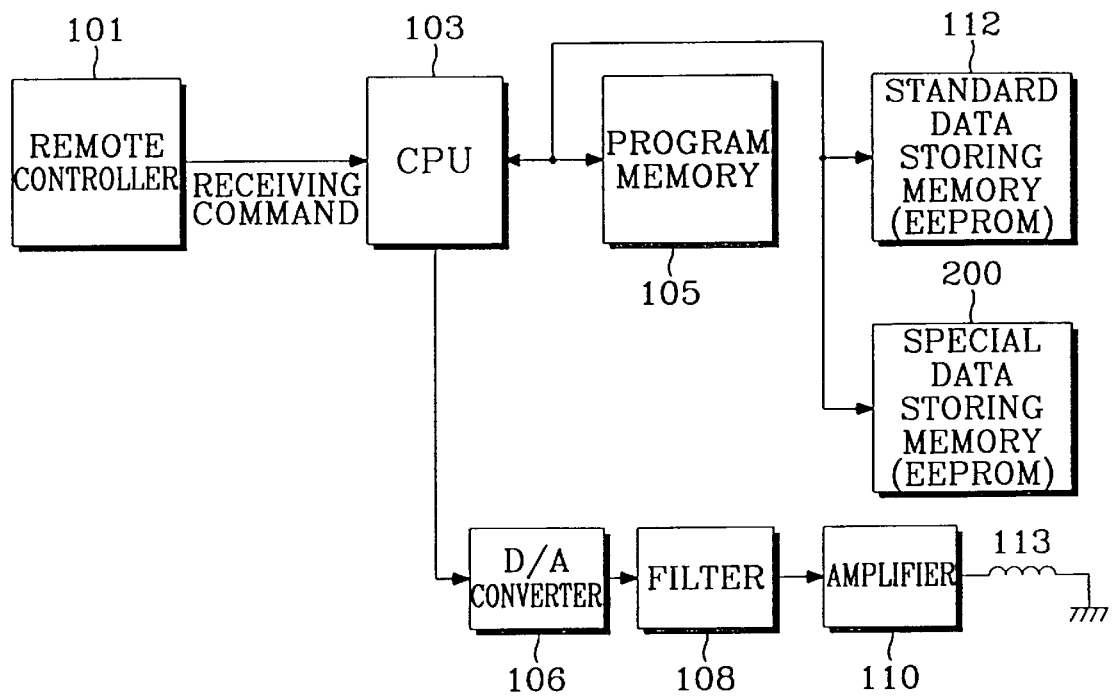
FIG. 2 is a circuit diagram according to an embodiment of the present invention.
Figure 3:
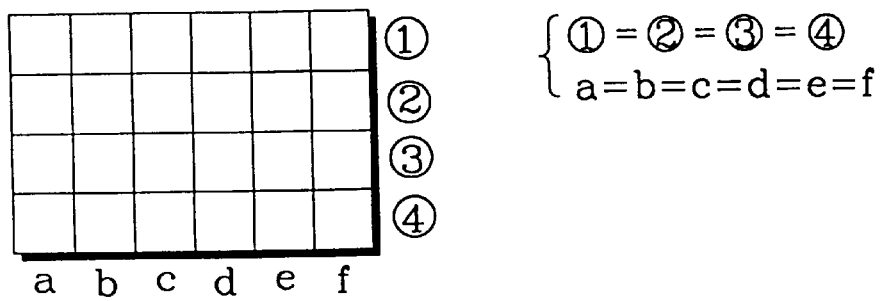
FIG. 3 is a sample graph of completing a color coincident according to the present invention.
Figure 4:
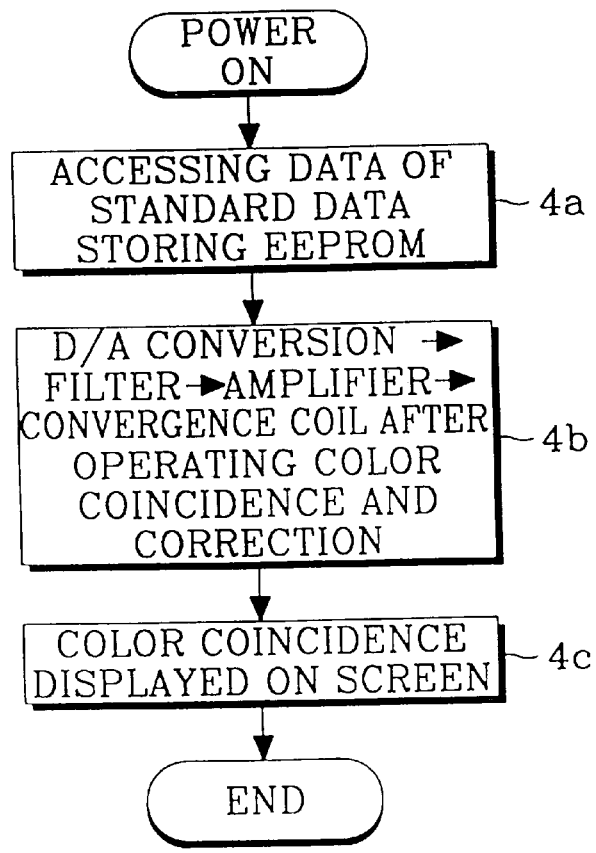
FIGS. 4 to 6 are flow charts of the process of color coincidence according to the present invention.

Referring to FIG. 2, a circuit according to an embodiment of the present invention is the same as that of FIG. 1 except for the addition of a special effect storing memory (EEPROM) 200. Referring to FIG. 4, a normal operation of the circuit, a first step 4a is performed for accessing standard data, a second step 4b is then performed for correcting and operating the standard data for color coinciding, converting the revised data, then filtering and thereafter sending the signal to a convergence coil, and finally a third step 4c is performed for displaying a normal color coincidence on a picture by the signal sent to the convergence coil.

Figure 5:
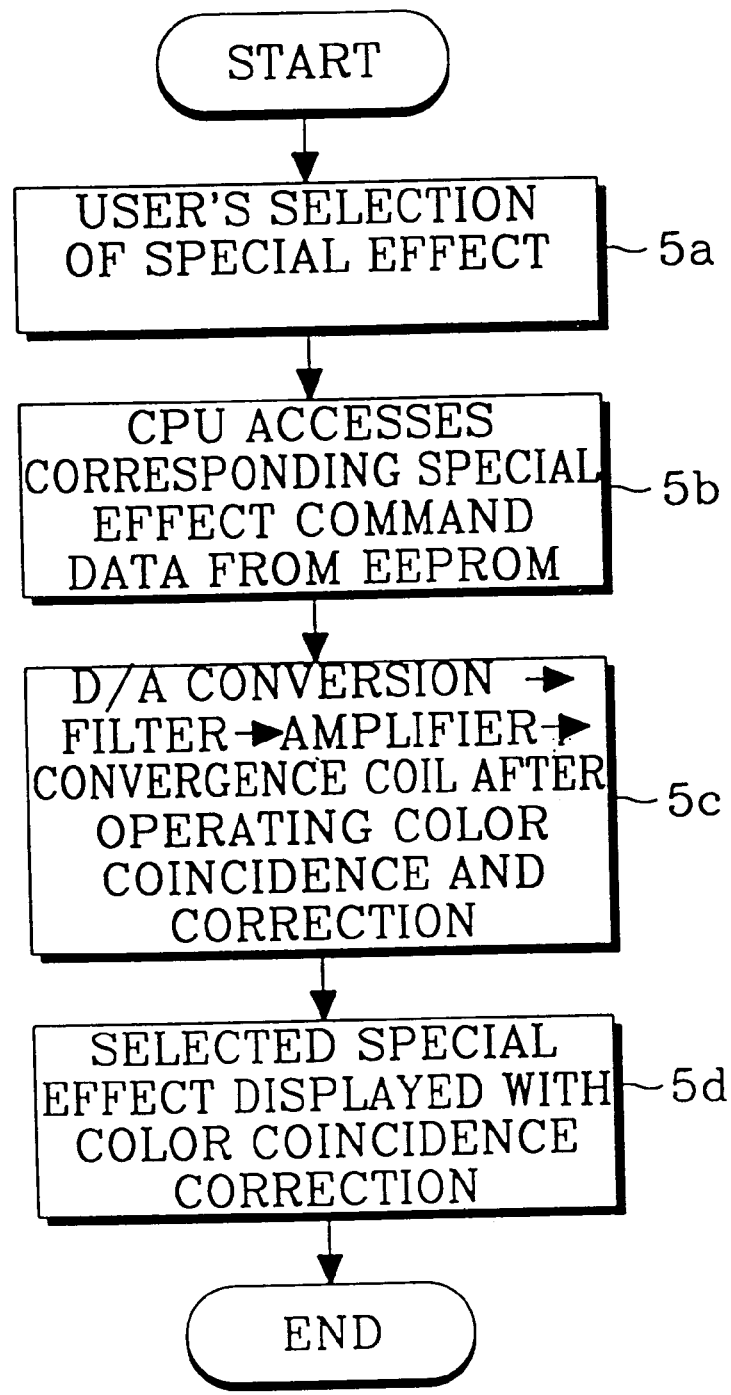

Referring to FIG. 5, an operation of a special effect selection according to the present invention is shown. The operation shown in FIG. 5 represents the operation of retrieving the special effect data previously stored in EEPROM 200. The special effect operation includes a first step 5a of the user selecting a special effect, a second step 5b for accessing special effect standard data from memory 200 according to the user special effect selection instruction, a third step 5c for correcting and operating the relevant special effect standard data, D/A converting the data to an analog signal, then filtering the data signal and finally sending the signal to a convergence coil, and a fourth step 5d for displaying a special effect color coincidence on a picture by the signal sent to the convergence coil.

Figure 6:
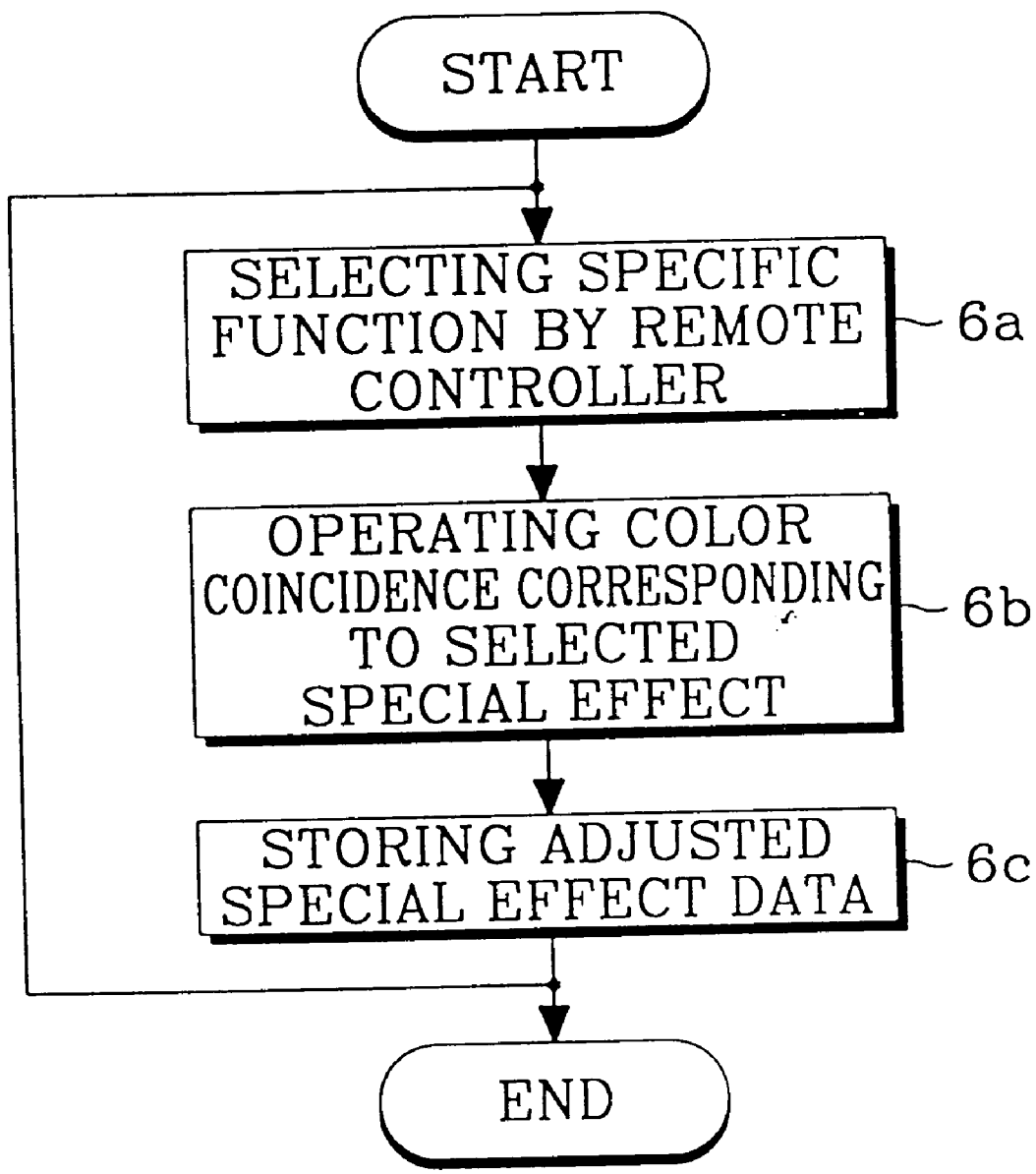

Referring to FIG. 6, the operation of storing special effect data in the EEPROM 200 includes a first step 6a for selecting a special function by a remote control, a second step 6b for adjusting a color coincidence corresponding to the selected special effect, and a third step 6c for storing the adjusted special effect data in EEPROM 200. Referring to FIGS. 4 to 6, the CPU 103 accesses relevant data from the special effect data storing memory 200 and then employs the accessed data performing color coincidence in a response to a special effect instruction from a user's remote control 101.

Referring to FIG. 4, in a normal operation, the CPU 103 accesses data from the standard data storing memory (EEPROM) 112 in step 4a and employs the assessed data for performing color coincidence, a D/A converter 106 converts the color coincidence data to an analog signal, and the analog signal is filtered and amplified by a LPF 108 and an amplifier 110 respectively, and then sent to a convergence coil in a step 4b. Thereafter the normal color coincidence is displayed in a picture of a CRT in a step 4c.

Referring to FIG. 5, in a selection of a special effects operation, the CPU 103 accesses relevant special effect standard data from the special effect data storing memory (EEPROM) 200 and uses the accessed data for correcting a color coincidence. The special effect standard data output by CPU 103 is converted to an analog signal by a D/A converter, filtered by LPF 108, amplified by an amplifier 110 and then sent to a convergence coil. Afterwards a color coincidence of the special effect is displayed in a picture of a CRT in a step 5d. Referring to FIG. 6, in producing special effect data, a selection instruction of a special function is sent by a remote control 101 in step 6a, a CPU 103 processes a color coincidence in accordance with the selected special effect in step 6b and the adjusted special effect data is stored in a special effect data storing memory 200.

Figures 7A, 7B:
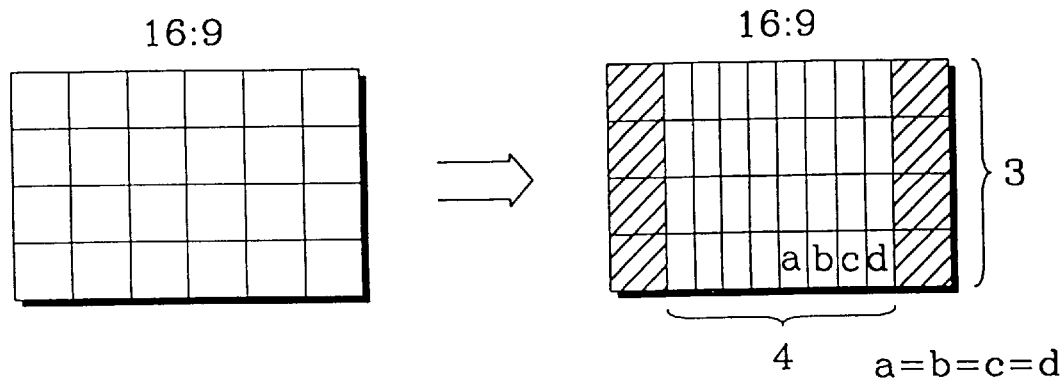

In the present invention, a method of correction and its effects by means of the digital convergence are described as follows. Referring to FIGS. 7A–7B, an aspect ratio 4:3 is secured by reducing a width of the convergence coil 113 so as to normalize a picture spread on right and left sides when converting a picture of aspect ratio 16:9 (FIG. 7A) to one of aspect ratio 4:3 (FIG. 7B).

Figures 8A, 8B:
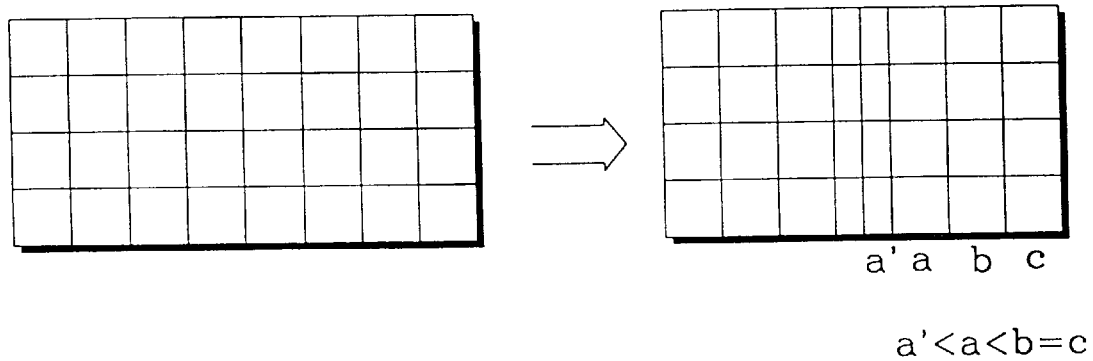

Referring to FIGS. 8A–8B, in viewing, for example, a news program in which the news person reports the news, a whole picture is displayed on a CRT screen while a center of the picture (wherein the news person would be located) becomes fine as shown in FIG. 8B by minutely correcting a convergence coil of a center of a CRT screen. Referring to FIGS. 9A–9B, in viewing, for example, a sports event or landscape, a picture is displayed so as to feel a sense of being both far and near by widening left and right sides and adjusting a horizontal line as shown in FIG. 9B.

Referring to FIG. 10, in viewing a picture in picture (hereinafter referred to as "PIP"), a picture is sharply outlined so as to provide a special effect of three dimensions by densely correcting an initial outline of the picture in picture by means of a color coincidence as shown in FIG. 10B. Referring to FIGS. 11A–11B, the special effect of three dimensions is secured by densely correcting a boundary between an original picture and a sub-picture or between sub-pictures by means of a color coincidence when displaying a PIP picture, as shown in FIG. 11B.

Referring to FIGS. 12A–12B, the special effect of providing an enlarged picture by enlarging the correction width of the convergence coil 113 as shown in FIG. 12B. Accordingly, the special effect of a television receiver with an aspect ratio 16:9 is diversified by means of the operation of a color coincidence of the accessed relevant data from the special effect data storing memory and the digital convergence.

What is claimed is:

1. A method for achieving a special effect on a TV screen by means of digital convergence comprising:

selecting a special effect;

performing a color coincidence in accordance with the selected special effect so as to obtain special effect data;

accessing special effect data corresponding to said selected special effect;

performing an operation according to the accessed special effect data to generate a color coincidence signal; and applying the color coincidence signal to a convergence coil so as to display the special effect on the TV screen.

2. The method according to claim 1, wherein the selecting of the special effect is performed by a user.

3. The method according to claim 2, wherein the user selects the special effect with a remote controller.

4. The method according to claim 1, wherein said performed operation includes D/A converting filtering and amplifying operations.

5. A circuit for achieving a special effect in a television set by means of digital convergence, comprising:

a central processing unit (CPU);

a program memory, connected to said CPU, for storing standard data;

a standard data memory, connected to said CPU, for storing color coincidence data;

a special data storing memory, connected to said CPU, for storing special effect data; and a convergence coil coupled to an output of said CPU.

6. A circuit according to claim 5, further comprising a D/A converter coupled to said CPU, a filter coupled to said D/A converter, and an amplifier coupled between said filter and said convergence coil.

7. The circuit according to claim 5, wherein said standard data memory and said special data storing memory each comprises an EEPROM.

8. The circuit according to claim 5, further comprising a remote controller for sending instructions to said CPU representing a desired special effect.

9. A circuit as defined in claim 5, wherein said special data storing memory includes at least one of data for displaying a picture of aspect ratio 4:3 at a screen of aspect ratio 16:9, data for displaying a finer picture in the center of the screen relative to other areas of the screen, data for displaying a picture which provides a sense of being far and near the picture, data for displaying a cubic effect in a boundary region in connection with a PIP display, and data for displaying an enlarged picture.

* * * * *